United States Patent [19]

Devine

[11] E Patent Number: Re. 33,523

[45] Reissued Date of Patent: Jan. 22, 1991

[54] HEATED COVER FOR PIPELINE BACKFLOW PREVENTER COMPONENT ASSEMBLY

[75] Inventor: Michael J. Devine, Jacksonville, Fla.

[73] Assignee: Commercial Insulation Company, Jacksonville, Fla.

[21] Appl. No.: 434,418

[22] Filed: Nov. 13, 1989

Related U.S. Patent Documents

Reissue of:

[64] Patent No.: 4,726,394
Issued: Feb. 23, 1988
Appl. No.: 37,726
Filed: Apr. 13, 1987

[51] Int. Cl.[5] ..... F16K 49/00

[52] U.S. Cl. ..... 137/341; 137/375; 137/550; 137/855

[58] Field of Search ..... 137/375, 341, 855, 550; 285/45

[56] References Cited

U.S. PATENT DOCUMENTS

| | | | |
|---|---|---|---|
| 1,108,840 | 8/1914 | Franke | 137/375 |
| 2,236,477 | 3/1941 | Fuchs | 137/550 |
| 3,724,491 | 4/1973 | Knudsen et al. | 137/375 |
| 4,207,918 | 6/1980 | Burns et al. | 137/375 |
| 4,259,981 | 4/1981 | Busse | 137/375 |
| 4,558,206 | 12/1985 | Ball | 137/341 |

*Primary Examiner*—A. Michael Chambers
*Attorney, Agent, or Firm*—Arthur G. Yeager

[57] ABSTRACT

A heated, insulated cover for a portion of a pipeline with valve and backflow preventer components exposed to the atmosphere, the cover being sectionalized so as to be asemblable around the valve components, with hand manipulated clamps to hold the cover together, an electric heating element inside the cover to keep it above freezing temperature, drain openings in the cover at ground level to let any water drain out of the cover, doors in the cover to permit inspection and testing of the components when the cover is in place.

30 Claims, 3 Drawing Sheets

HEATED COVER FOR PIPELINE BACKFLOW PREVENTER COMPONENT ASSEMBLY

Matter enclosed in heavy brackets [ ] appears in the original patent but forms no part of this reissue specification; matter printed in italics indicates the additions made by reissue.

BACKGROUND OF THE INVENTION

It is well known that water lines which are exposed to the atmosphere and cold temperatures need protection from freezing. Many pipelines are run underground for this reason as well as for aesthetic reasons of removing the pipelines from sight. The problems of maintenance, access and operation of the backflow preventer components in the pipeline, however, make it impractical to have every portion of the line underground. Backflow preventers must vent to the atmosphere making burial impossible and installation in a floodable pit impractical. The compromise in many installations is to bury the pipeline except for the sections having valves and backflow preventers which must be adjusted or serviced. These sections are positioned just above ground level with the pipeline upstream and downstream from the valve sections being underground. These exposed sections are subject to freezing and becoming inoperable unless they are protected from the weather.

It is an object of this invention to provide a heated cover for a valve and backflow preventer components of a pipeline. It is another object of this invention to provide such a cover which is sectionalized for easy assembly or disassembly from around such components and to include inspection access doors to allow for the periodic testing and certification required by law. Other objects will become apparent from the more detailed description which follows.

BRIEF DESCRIPTION OF THE INVENTION

This invention relates to a heated cover for pipeline valves and backflow preventer, comprising an insulated cover adapted to encapsule the components in a pipeline with openings in said cover to permit said pipeline to pass through upstream and downstream of said valve; an electric heating element inside said cover, means to supply electric power to said element, openings to drain water from inside to outside said cover; said cover being sectionalized into portions which are assemblable into a complete cover around said pipelines components.

In specific embodiments of this invention the cover is sectionalized into two or four parts for ease in assembly or disassembly. In another embodiment the cover has openings for draining water out of the cover while preventing air from blowing into the cover. In a further embodiment the cover includes a plurality of access doors for inspection and maintenance of the components with removal of the cover.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

Figure 1:
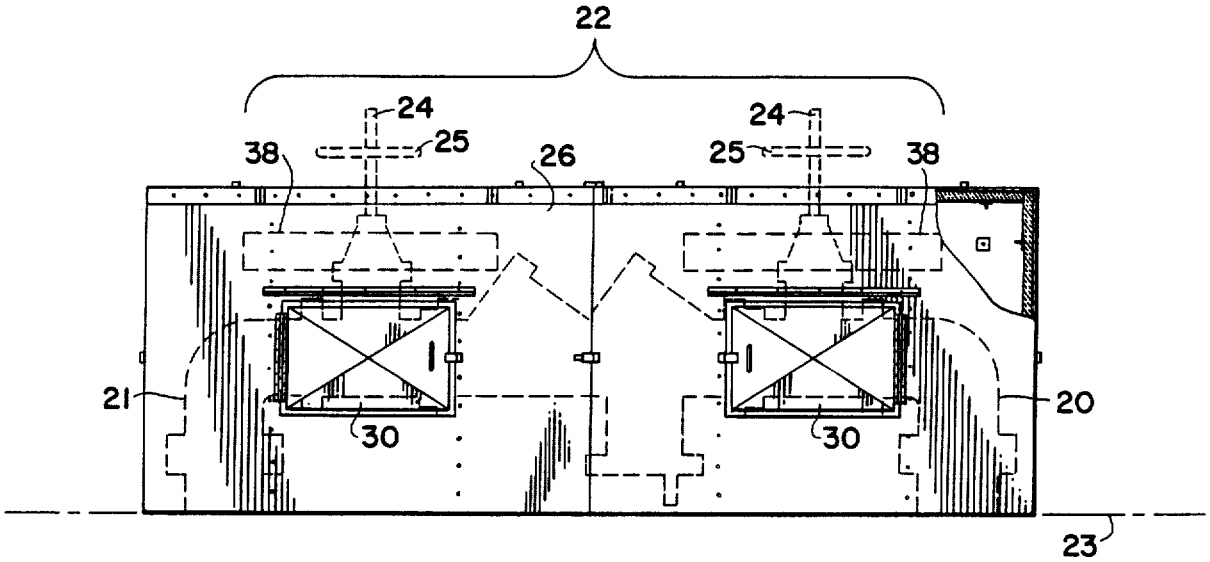
FIG. 1 is a front elevational view of the cover of this invention.
Figure 2:
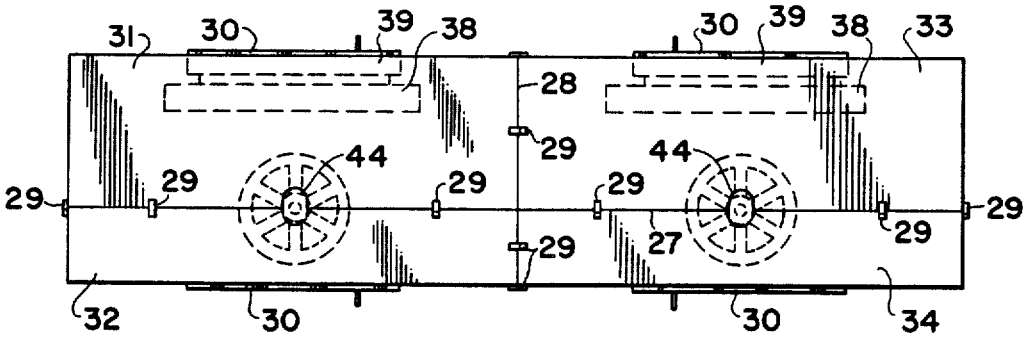
FIG. 2 is a top view of a first embodiment of the cover of this invention.

The details of the invention are best understood by reference to the attached drawings. The first embodiment of this invention is shown in FIGS. 1-5. A housing or cover 26 encloses or encapsulates a pipeline section above ground level 23. The pipeline section includes an upstream pipeline 20 and a downstream pipeline 21 separated by a valve and backflow preventer component section 22 which may include any combination of valves and associated equipment. In these drawings there are depicted two hand wheel operated valves with check valves and backflow preventer between the two. It is important that the valve stems 24 and the hand wheels 25 be accessible for adjustment and servicing and these are outside cover 26 while all other parts of the pipeline and valve components are enclosed by cover 26. This is accomplished by providing openings 44 through cover 26 to permit passage of valve stems 24 therethrough.

Cover 26 is sectionalized so as to facilitate its assembly to or its disassembly from the pipeline and its components. In the embodiment of FIGS. 1-5 there are four sections 31, 32, 33, and 34 formed by parting lines in a longitudinal plane 27 passing through the center lines of pipelines 20 and 21 and the valve component 22 and a transverse plane 28 perpendicular to plane 27, generally producing four sections 31, 32, 33 and 34 of about equal size. Sections 31, 32, 33 and 34 are held together by hand manipulated clamps 29 in a suitable number and in such positions as to facilitate assembly and disassembly. Clamps 29 may be of any design which is quick acting and a secure fastener.

Inspection doors 30 are positioned to permit inspection, servicing and testing of the components while the cover 26 is in place. The number and positioning of doors 30 will depend on the servicing, inspection and testing requirements of the components 22.

The cover 26 is made of any convenient component parts, usually including a framework of structural shapes, e.g., angle bars, tubes, beams, or the like, and a covering skin 35 of any weather resistant, impervious material, e.g., metal, wood, or plastic, preferably aluminum sheet. The inside of the sheet 35 is covered with a suitable thickness of heat insulation material 36.

Figure 3:
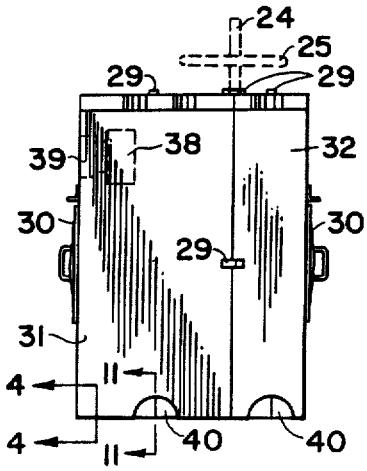
FIG. 3 is an end elevational view of the cover shown in FIGS. 1 and 2.
Figure 4:
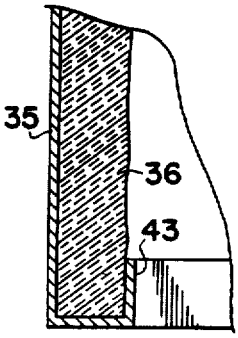
FIG. 4 is a cross sectional view taken at 4—4 of FIG. 3.
Figure 5:
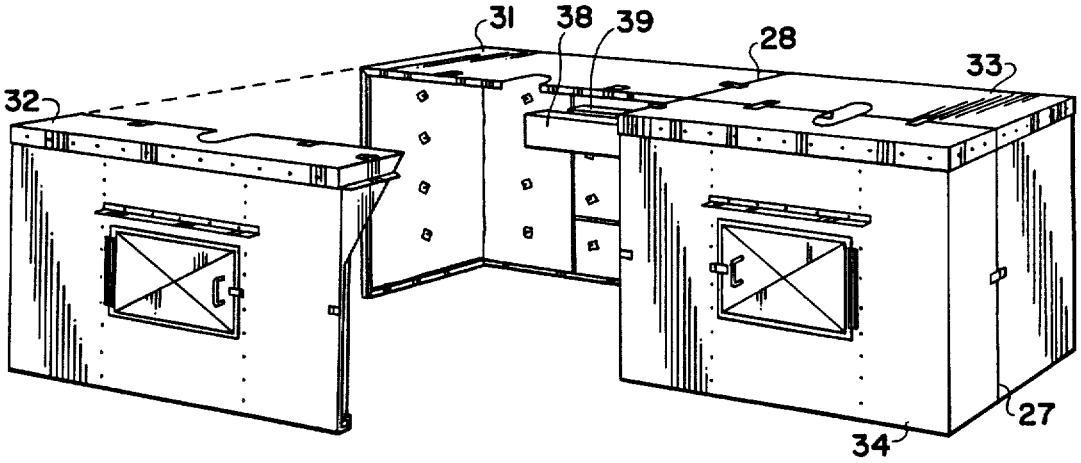
FIG. 5 is an exploded perspective view of the cover shown in FIGS. 1 and 2.
Figure 11:
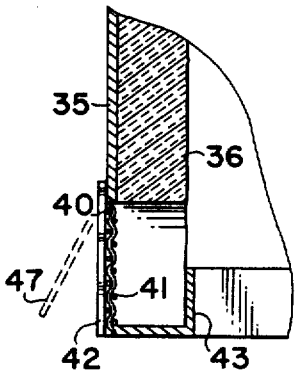
FIG. 11 is a cross sectional view taken at 11—11 of FIG. 3.

Since cover 26 frequently rests on the ground, the component 22 discharges water under normal operation, it is necessary to provide a means for water to drain out of cover 26. This is best accomplished by one or more openings 40. Preferably openings 40 are covered with a screen or mesh (see FIG. 11) to prevent rodents or serpents from entering cover 26 and a flap of impervious material 42 which will prevent air from blowing into cover 26, particularly cold air during freezing weather. Flap 42 may be any flexible material, such as fabric, plastic, rubber, or the like, which will flex outwardly as at 47 to permit water to flow outwardly. For this purpose flap 42 may be cut vertically as shown in FIG. 3 to permit the flexing of such a flap. In this connection it is preferred that insulation layer 36 is positioned in a channel 43 around the bottom of cover 26 so that any water inside cover 26 will not saturate insulation layer 36 and possibly freeze there.

Inside cover 26 are one or more electric heating elements 38 on suitable supporting brackets 39. The number of heating elements 38 needed will of course, depend on the size of cover 26, its heat insulating properties, and the outside weather conditions. A power line and thermostat means to turn the power on and off are also required.

Figure 6:
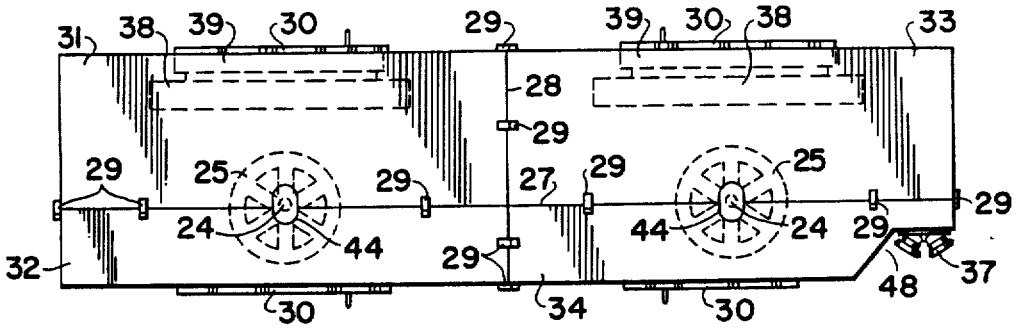
FIG. 6 is a top view of a second embodiment of the cover of this invention.
Figure 7:
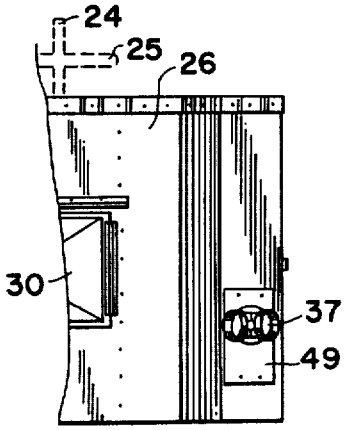
FIG. 7 is a partial front elevational view of the cover shown in FIG. 6.

In FIGS. 6 and 7 there is shown a second embodiment in which a fire hose attachment is included as may be desirable or required by local government regulations. Generally, this merely requires a branch line from pipeline 20 and a Y-fitting 37 to which a fire hose is attachable. This embodiment may be preferably designed to include an indented portion 48 of cover section 34 with a detachable cover plate 49 which can be removed when disassembling cover 26.

Figure 8:
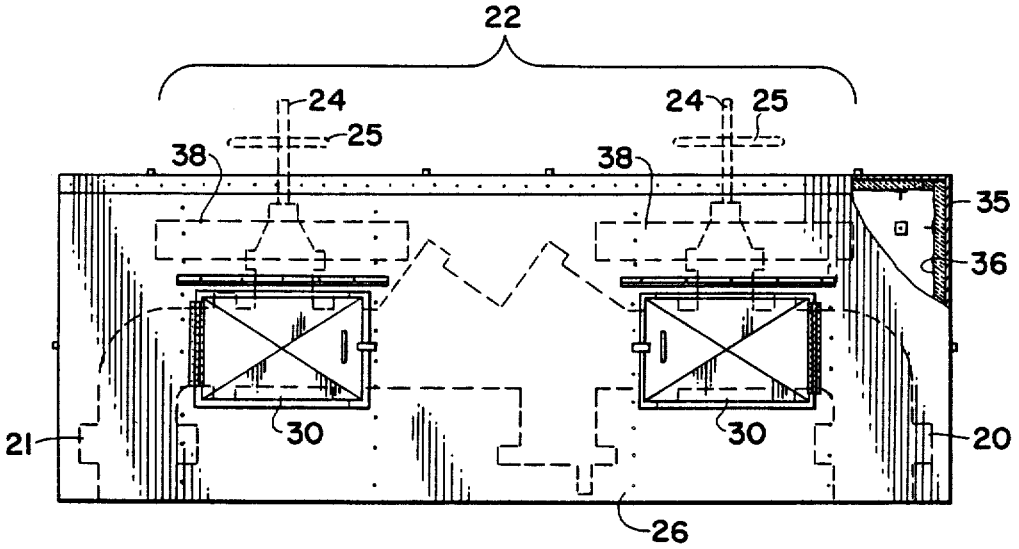
FIG. 8 is a front elevational view of a third embodiment of the cover of this invention.
Figure 9:
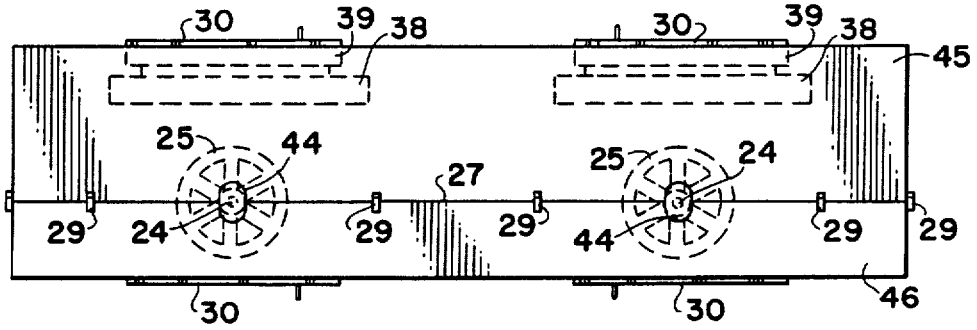
FIG. 9 is a top view of the cover of FIG. 8.
Figure 10:
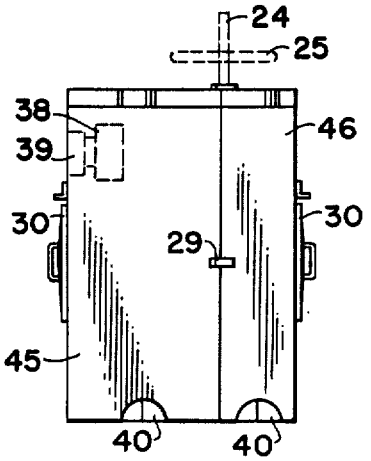
FIG. 10 is an end elevational view of the cover of FIGS. 8 and 9.

A third embodiment is shown in FIGS. 8–10 wherein cover 26 is made of two sectionalized portions 45 and 46 rather than the four portions 31, 32, 33 and 34 of FIGS. 1–5. Portions 45 and 46 are joined along longitudinal plane 27 which passes through the center lines of the pipelines 20 and 21 and valve components 22. Other than that difference the embodiments are the same.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A heated cover for pipeline valve and backflow preventer components above ground comprising an assemblable insulated housing having side walls and a top wall and adapted to substantially enclose the components with an open bottom of said housing to permit the pipeline to pass through upstream and downstream of the components, said housing being substantially spaced outwardly from the components, an electric heating element disposed within said housing, means to supply electric power to said element, spaced openings passed through at least opposed said side walls of said housing adjacent said open bottom to drain water discharged from the components from within and outwardly of said housing, said housing being formed of sectionalized portions which are assemblable into a complete cover around the components, said housing having an opening formed in said top wall between said sectionalized portions through which a stem of a manually closeable valve extends outwardly thereof for manipulation of the valve without removal of said cover.

2. The cover of claim 1 wherein said housing includes two sectionalized portions meeting at a longitudinal plane passing through the center line of the pipeline upstream and downstream of the components.

3. The cover of claim 1 wherein said housing includes four sectionalized portions being releasably connected along a longitudinal plane and along a transverse plane perpendicular to and generally medially of said longitudinal plane.

4. The cover of claim 1 further comprising hand manipulated clamps spaced along said sectionalized portions for releasably attaching said sectionalized portion together when assembled around the components.

5. The cover of claim 1 further comprising at least one access door through at least one said side wall openable from outside said cover for providing access to and inspection and testing of the components without removal of said cover.

6. The cover of claim 1 wherein said housing includes a pair of spaced said walls, said housing further including at least a pair of spaced doors respectively mounted on said side walls.

7. The cover of claim 1 which includes an opening through one side wall for a fire hose fitting to pass therethrough and be exposed outwardly of said housing, said fire hose fitting communicating with the pipeline inwardly of said cover to supply water thereto in the event of a fire or the like.

8. The cover of claim 1 wherein said housing is in the form of a rectangular box-shaped structure with said open bottom being adapted to rest on the ground, and a plurality of spaced fasteners connecting said portions firmly together.

9. A heated disassemblable cover for a section of a pipeline having a valve and backflow preventer components above ground level and pipeline upstream and downstream of the components underground, said cover comprising a rigid material formed into a housing a weather resistance impervious material substantially enclosing and spaced outwardly of the components, said cover being sectionalized into a plurality of manually assemblable portions including portions on two sides of a longitudinal plane passing through the center line of the pipeline upstream and downstream of the components, said cover having side walls and a top wall and an open bottom, including at last one hinged access door in at least one of said side walls, for providing access to and inspection and testing of the components while said cover encloses the components without removal of said cover, said cover including an opening in said top wall adapted to permit a valve stem to pass therethrough and a hand wheel of a valve to be located outside said cover and operable when said cover is in place, said cover having heat insulation material covering substantially all of the inside surface thereof spaced outwardly of the components, an electric heating element inside said cover and spaced outwardly of the components, means to supply electric power to said heating element, said cover having at least one opening through at least one of said side walls closely adjacent said open bottom to permit water discharged from the components to flow from inside to outside said cover.

10. The cover of claim 9 further comprising a plurality of spaced fastening means to selectively connect said assemblable portions firmly together.

11. The cover of claim 9 wherein said rigid material is metal formed into said assemblable portions.

12. The cover of claim 9 wherein said cover includes four sectionalized portions meeting at said longitudinal plane and a transverse plane perpendicular to and generally medially of said longitudinal plane.

13. The cover of claim 9 wherein said cover is in the form of a rectangular box with said top wall and sides being closed and said open bottom being adapted to rest on and be closed by the ground.

14. The cover of claim 9 wherein said cover includes a screen covering said opening adjacent said open bottom and an air-impermeable flap overlying said screen adapted to permit water to flow outwardly through said screen and flap and to substantially obstruct air from flowing into said cover through said flap.

15. The cover of claim 9 which includes an opening through one side wall for a conduit to pass therethrough from the pipeline inside said cover to a fitting outside said cover to which a first hose is attachable.

16. A disassemblable cover for a section of a pipeline having valve and backflow preventer components above ground level and underground pipeline upstream and downstream of the components, said cover comprising a framework means supporting a skin means of weather resistant impervious material spacedly outwardly of the components, said cover being sectionalized into a plurality of manually assemblable portions including top portions on two sides of a longitudinal plane passing through the center line of the pipeline upstream and downstream of the components, said cover including a hinged access door for inspection and testing of the components while said cover is in place, said cover including at least one opening in said top portion adapted to permit a valve stem to pass therethrough and a manually operated hand wheel of a valve to be disposed outwardly of said cover and operable to close a valve when said cover is in place, said cover having insulation material covering substantially all of the inside surface thereof, an electric heating element connected to one of said assemblable portions inside said cover, means to supply electric power to said heating element, said cover having at least one opening therethrough at ground level to permit water discharged from the components within said cover to flow outwardly therethrough.

17. The cover of claim 16 wherein said skin means includes an opening therethrough for accommodating a fire hose fitting passing through said opening, said fire hose fitting communicating at one end with the pipeline within said cover and having another end outwardly of said cover adapted for connection to a fire hose.

18. The cover of claim 16 wherein said framework means includes a rectangular box-shaped structure with an open bottom adapted to engage the ground, and another hinged access door disposed in a generally aligned position with respect to said door.

19. The cover of claim 16 further comprising three other access doors hingedly connected to said framework means and said skin means, two of said doors being located on respective opposite sides of the components.

20. The cover of claim 16 wherein said cover includes another opening therethrough at ground level, said openings at ground level being located in general opposing relation so that water may pass outwardly therethrough in opposing directions, said cover further comprising a screen covering each said opening at ground level and an air-impermeable flap overlying said screen adapted to permit water to flow out through said screen and flap and to substantially prevent the flow of air into said cover.

*21. A heated cover for pipeline valve and backflow preventer components above ground comprising an insulated housing having side walls and a top wall and adapted to substantially enclose the components with an open bottom of said housing adapted to be supported by the ground and to permit the pipeline to pass through upstream and downstream of the components, said housing being substantially spaced outwardly from the components, an electric heating element disposed within said housing, means to supply electric power to said element, said housing having at least one opening passing through at least one said side wall adjacent said open bottom to drain water discharged from the components from within through said opening and outwardly of said housing, said housing having at least one access door openable from outside said cover for providing access to and inspection and testing of the components without removal of said cover from around the components.*

*22. The cover of claim 21 wherein said housing is in the form of a rectangular box-shaped structure with said open bottom being adapted to rest on the ground, and hinge means connecting said access door to one said wall of said housing.*

*23. The cover of claim 21 further comprising heat insulation material covering substantially all inside surfaces of said housing spaced outwardly of the components.*

*24. The cover of claim 21 wherein said housing includes two sectionalized portions meeting at a longitudinal plane passing through the center line of the pipeline upstream and downstream of the components.*

*25. The cover of claim 21 wherein said cover includes four sectionalized portions meeting at a longitudinal plane and a transverse plane perpendicular to and generally medially of said longitudinal plane.*

*26. The cover of claim 21 further comprising a screen covering said opening adjacent said open bottom and an air-impermeable flap overlying said screen adapted to permit water to flow outwardly through said screen and flap and to substantially obstruct air from flowing into said cover through said flap.*

*27. The cover of claim 26 wherein said flap includes a lower edge and a split substantially along a vertical line to permit flexing thereof outwardly of said cover while water is being discharged through said opening and screen.*

*28. The cover of claim 21 wherein said cover includes another opening therethrough at ground level, said openings at ground level being located in general opposing relation so that water may pass outwardly therethrough in opposing directions, a pair of screens covering respective said openings at ground level.*

*29. The cover of claim 28 further comprising a pair of air-impermeable flaps overlying respective said screens to permit water to flow out through said screens and said flaps and to substantially prevent the flow of air into said cover through said openings.*

*30. The cover of claim 29 wherein each said flap includes a lower edge and a split from said lower edge to permit flexing thereof outwardly of said cover while water is being discharged through respective said opening and screen.*

* * * * *